UNITED STATES PATENT OFFICE.

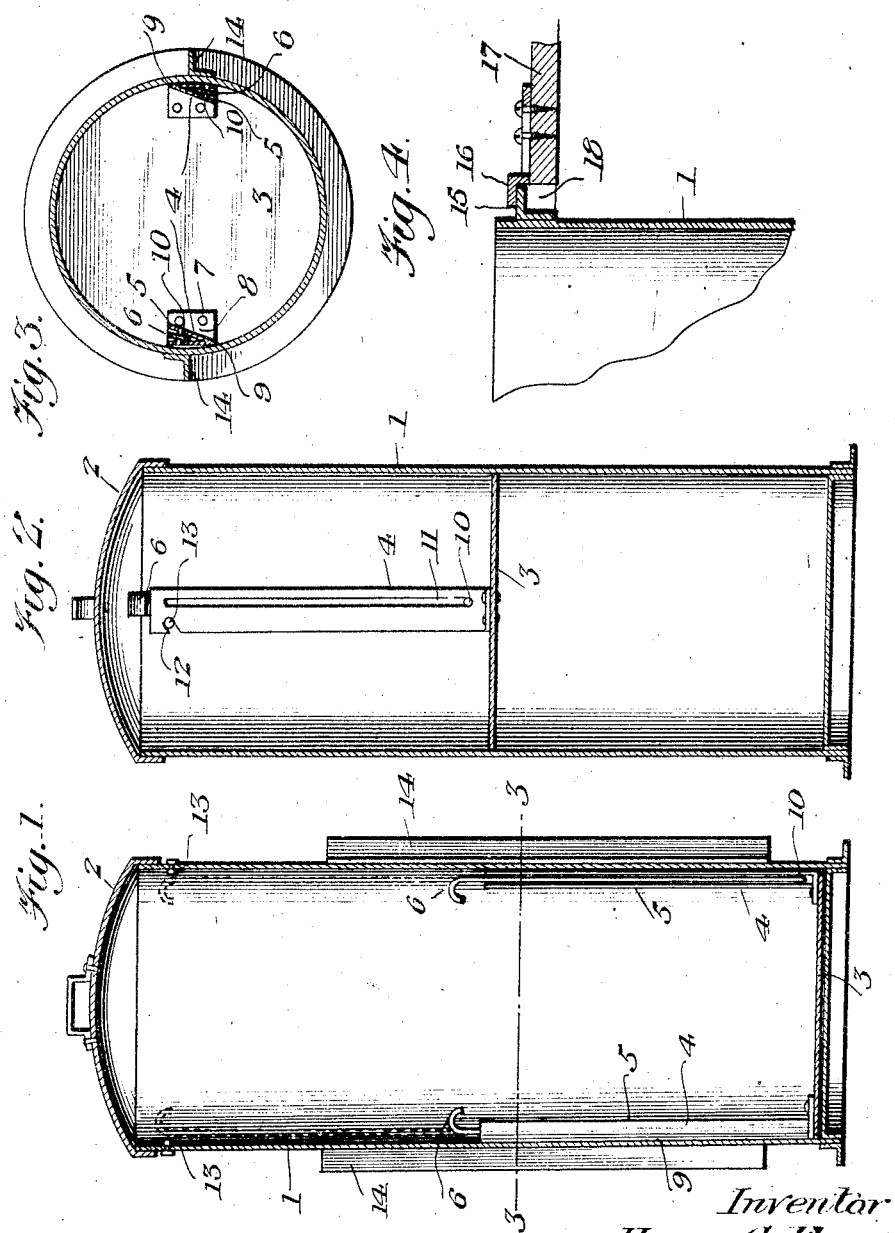

HARRY C. FRENCH, OF ONTWA TOWNSHIP, CASS COUNTY, MICHIGAN.

ICE-CREAM CAN OR CONTAINER.

1,218,640.   Specification of Letters Patent.   Patented Mar. 13, 1917.

Application filed September 30, 1916. Serial No. 123,085.

*To all whom it may concern:*

Be it known that I, HARRY C. FRENCH, a citizen of the United States, residing in Ontwa Township, in the county of Cass and State of Michigan, have invented certain new and useful Improvements in Ice-Cream Cans or Containers, of which the following is a specification.

The invention is directed to an improvement in ice cream cans or containers, and more particularly to a means, in the use of which, the material in the lower portion of the can may, after the upper portion of such material has been used from the can, be brought to a position in the upper portion of the can, from which it may be more conveniently dispensed.

In ice cream containers designed for use under those conditions where the material is periodically dispensed from the can in comparatively small quantities, as at soda water fountains, ice cream parlors and the like, considerable difficulty is occasioned in reaching the material in the lower half of the can, after the upper portion of such material has been taken therefrom. The containers are ordinarily of considerable size, and in reaching for the material in the lower part of the can, the attendants are compelled to reach the arm therein which is objectionable from a sanitary standpoint, as well as from the fact that the sleeve and coat of the attendant become wet from the particles of the material adhering to the upper portion of the can.

The present invention is designed to obviate this difficulty in providing a means whereby the material remaining in the lower portion of the can, after removal of the upper portion, may be readily and conveniently brought as an entirety to the upper portion of the can, where it is readily and conveniently accessible.

In structure, the invention contemplates a false bottom, provided with diametrically opposite handle members, by which the bottom may be lifted, carrying with it the material supported thereon, the handle members being of telescopic sections, one or more of which are formed to provide scrapers by which the material in the lower portion of the can may be bodily loosened from the wall of the can prior to the lifting movement of a false bottom.

The invention in the preferred form of details will be described in the following specification, reference being had particularly to the accompanying drawings, in which:—

Figure 1 is a vertical section of the improvement, the false bottom being in the extreme lowered position;

Fig. 2 is a similar view, the false bottom being shown elevated, and the handle members locked to support the bottom in such elevated position;

Fig. 3 is a section on line 3—3 of Fig. 1;

Fig. 4 is a broken sectional view illustrating the detail.

In the accompanying drawings, I have illustrated an ordinary ice cream can or container 1, having the usual removable top or cover 2.

Within the can or container I arrange a false bottom 3, having a diameter corresponding to the interior diameter of the can, and adapted when in normal or lowered position to rest squarely upon the bottom of the container, and act as the underlying support for the ice cream or other material within the container.

Secured at diametrically opposite points to the false bottom are what I term handle members 4, including telescopically connected sections 5 and 6. The lower section, 5, which is secured directly to the false bottom as at 7, is made up of elongated plates 8 secured together to present a sharpened or scraping edge 9. The scraping edge 9, extends throughout the length of the lower section of the handle, and from this scraping edge the plates forming this section diverge, as clearly shown in Fig. 3. The handle members, or more particularly the scraping sections thereof, are secured to the false bottom so that the sharpened or scraping edges of such members extend in the same direction circumferentially of the can, whereby on rotating such members the material will be scraped from the side of the can and by reason of the divergent inner plate of such members, the material will be forced an appreciable distance from the interior surfaces of the can.

The upper section 6 of the handle members is of flat strip like form, the lower end of which is provided with a lateral pin 10, slidably seating in a groove 11 in one of the plates of the lower handle member 5. If desired each of the plates in the lower handle member may be formed with a slot and the pin 10 of a length to engage both slots. The main requirement here is the complete housing of the upper handle member between the walls of the lower handle when the walls are telescoped, the relative sliding movements of the members, and the connection between the members so that the entire structure may be properly rotated through manipulation of the upper handle members.

As will be apparent from the drawings when the material has been used from the container for approximately half the depth of said container, the false bottom is rotated by means of the extended upper handle members. This movement separates the material from the inner surface of the container wall, whereupon, by means of the handle members, the false bottom with the material thereon is drawn upwardly to position the materials in the upper portion of the can where it is conveniently accessible. To secure the material in this position the false bottom is held elevated by engaging the upper ends of the lower portions of the handle members with fixed elements on the container. As illustrated provision is made for this result by forming the relatively rear or free edge of one of the plates 8 of the lower handle member, or scraper section, with a notch 12 and properly located studs 13, preferably threaded through the container wall, to be engaged by the notches. In this position of the parts, the upper sections of the handle members are telescoped or moved downwardly into the lower portions of such members to permit convenient application of the can top 2, as clearly shown in Fig. 2.

As the false bottom is rotated and then elevated, it may be desirable to provide means to prevent similar movements of the container proper during this operation. To this end I have indicated vertically arranged strips 14, secured on the container and embedded in the ice in the box in which the container is placed. I also prefer to provide the container near the upper portion, with laterally extending lugs 15, to engage beneath offset hooks 16, secured to the upper wall of the box 17, in which the containers are placed, the depending walls 18 of the hooks serving to prevent rotation of the can in one direction, while the tops of the hooks prevent elevation of the can.

Having described my invention what I claim and desire to secure by Letters Patent is:—

1. A container having a removable top, a false bottom therefor, handle sections rigidly secured to the false bottom, telescopic handle sections connected with the rigid handle sections, and means carried by the rigid handle sections coöperating with means within the container for supporting the false bottom in elevated position, whereby the telescopic handle sections may be shifted wholly within the container and the top applied with the false bottom in elevated position.

2. A container, a false bottom therefor, and handle members connected to and adapted to operate said false bottom, said handle members being made up of telescopically related sections, one section of each member being formed to provide a scraper disposed in contact with the inner surface of the container.

3. A container, a false bottom therefor, handle members for operating the false bottom and including scraper sections, and coöperating means carried by the container and scraper sections to engage the latter and support the false bottom in an elevated position.

4. A container, a false bottom therefor, handle members for operating the false bottom and including scraper sections, pins projecting inwardly from the container, the said scraper sections being formed with notches to engage the pins.

5. An elevating member for containers including a false bottom, and handle sections secured in opposed relation thereto, the handle sections comprising lower members formed of divergent plates meeting to provide a scraper edge, and an upper member operating between the plates of the lower member and having a pin slidably engaging the slot in one of said plates.

In testimony whereof I affix my signature in presence of two witnesses.

HARRY C. FRENCH.

Witnesses:
 GEORGE J. OLTSCH,
 AGNES GORDON.